United States Patent Office 3,130,234
Patented Apr. 21, 1964

3,130,234
PROCESS FOR PRODUCING GLYOXAL
TETRAETHYL ACETAL
Harry A. Stansbury, Jr., and David T. Manning, South Charleston, W. Va., assignors to Union Carbide Corporation, a corporation of New York
No Drawing. Filed Jan. 25, 1961, Ser. No. 84,759
2 Claims. (Cl. 260—615)

The instant invention relates to a new process for the preparation of glyoxal tetraethyl acetal (1,1,2,2-tetraethoxyethane).

Glyoxal tetraethyl acetal is useful as an agent for the cross-linking of polyvinyl alcohol fibers and as an ore flotation agent. Glyoxal tetraethyl acetal is also useful as an intermediate for the preparation of glyoxal.

The process of this invention generally comprises reacting ethanol with nitrosyl chloride to form glyoxal tetraethyl acetal. This process can be illustrated by the following equation:

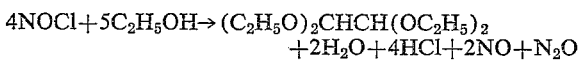

The process of this invention can be conducted at a temperature of from about 0° C. to about 100° C. Temperatures of from about 20° C. to about 60° C. are preferred.

The process of this invention can be conducted at a pressure of from about 5 p.s.i.a. to about 150 p.s.i.a. and preferably at from about 15 p.s.i.a. to about 50 p.s.i.a.

Reaction times of from about 1 hour or less to about 50 hours or more can be employed, but times of from about 3 hours to about 20 hours are preferred.

Although nitrosyl chloride is shown above as one of the reactants, mixtures which form nitrosyl chloride under the reaction conditions can also be employed, such as a mixture of nitric oxide and chlorine:

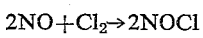

and a mixture of nitric oxide, hydrogen chloride and oxygen or air

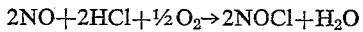

The molar ratio of ethanol to nitrosyl chloride can be from about 1:1 to about 30:1, respectively, although molar ratios of from about 5:1 to about 15:1 are preferred.

The glyoxal tetraethyl acetal can be recovered from the reaction mixture by treating said mixture with sufficient aqueous alkali metal hydroxide to neutralize the hydrogen chloride formed by the reaction and to saponify by-product esters. From about 1 mole to about 10 moles or more of alkali metal hydroxide per mole of nitrosyl chloride charged to the reaction can be employed although from about 1.5 moles to about 3 moles are preferred.

Any alkali metal hydroxide can be employed in the process of this invention, such as lithium hydroxide, sodium hydroxide, potassium hydroxide, and the like.

The resulting reaction mixture is refluxed for about 1 hour to about 3 hours, and preferably for about 1½ hours, and then distilled to remove unreacted ethanol.

The residue is extracted with an organic solvent for the glyoxal tetraethyl acetal, such as petroleum ether and ethers such as ethyl ether and isopropyl ether according to known extraction procedures. The solvent is then distilled from the extracts, leaving glyoxal tetraethyl acetal as the product.

A preferred embodiment of the process of this invention comprises reacting nitrosyl chloride with ethanol, employing an ethanol to nitrosyl chloride mole ratio of from about 5:1 to about 15:1, at a temperature of from about 20° C. to about 60° C. at a pressure of from about 15 p.s.i.a. to about 50 p.s.i.a., for from about 3 hours to about 20 hours. The resulting reaction mixture is mixed with sufficient aqueous sodium hydroxide to make the reaction mixture basic and refluxed for about 1½ hours. The resulting mixture is distilled to recover the ethanol, after which the residue is extracted with ethyl ether. The ether is distilled from the ether extracts, leaving the glyoxal tetraethyl acetal as a residue.

The following example is illustrative:

*Example*

Anhydrous ethanol weighing 800 grams (one liter, 17.4 moles) was placed in a reaction vessel and maintained with stirring at 23 to 31° C. Gaseous nitrosyl chloride weighing 114 grams (1.74 moles) was fed to the ethanol through a diffuser over a period of 1 hour. The resulting mixture was heated at 38–43° C. for 21 minutes. The resulting reaction mixture was allowed to stand for 16 hours at 25° C. after which it was heated to 58° C. and 667 grams of 20 percent aqueous sodium hydroxide (3.34 moles) were added. The resulting mixture was refluxed at 79° C. for 1.5 hours and then distilled at 35 millimeters of mercury pressure to remove unreacted ethanol. The residue, which weighed 585 grams, was extracted four times with 500-milliliter portions of ethyl ether. The extracts were combined and dried over sodium sulfate. The ethyl ether was removed from the extracts by evaporation and the residue was distilled to yield 44 grams of glyoxal tetraethyl acetal, which represented a yield of 49 percent based on nitrosyl chloride. The infrared absorption spectrum of the product was identical to that of a known sample of glyoxal tetraethyl acetal. By elemental analysis the product was found to contain 58.47% of carbon and 10.65% of hydrogen. (Calculated values, based on $C_{10}H_{22}O_4$, are 58.22% of carbon and 10.75% of hydrogen.) The properties of the glyoxal tetraethyl acetal were:

Boiling point—79° C. at 10 mm. of mercury
Refractive index ($n$ 20/D)—1.4051

What is claimed is:
1. The process for producing glyoxal tetraethyl acetal which comprises reacting nitrosyl chloride with ethanol at a temperature of from about 20° C. to about 60° C. and a pressure of from about 15 p.s.i.a. to about 50 p.s.i.a.
2. The process for producing glyoxal tetraethyl acetal which comprises reacting nitrosyl chloride with ethanol in a mole ratio of ethanol to nitrosyl chloride of from about 5:1 to about 15:1 at a temperature of from about 20° C. to about 60° C. and a pressure of from about 15 p.s.i.a. to about 50 p.s.i.a.

References Cited in the file of this patent
Lee et al.: Jour. Amer. Pharm. Assn., vol. 21 (1932), pp. 125–128.